UNITED STATES PATENT OFFICE.

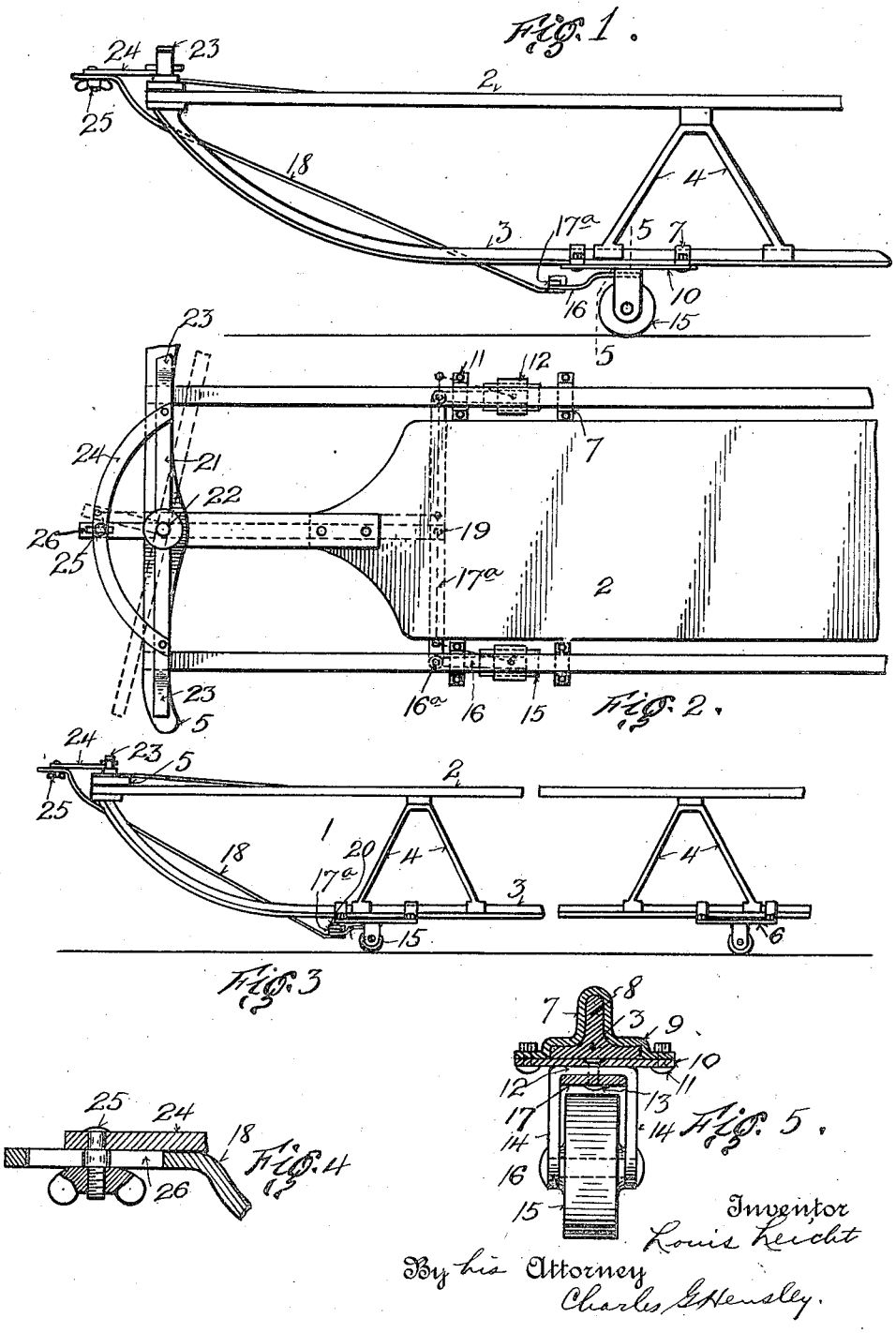

LOUIS LEICHT, OF YONKERS, NEW YORK, ASSIGNOR OF ONE-HALF TO JOHN WALTER, OF YONKERS, NEW YORK.

ATTACHMENT FOR SLEDS.

1,380,660.

Specification of Letters Patent. Patented June 7, 1921.

Application filed July 28, 1919. Serial No. 313,727.

*To all whom it may concern:*

Be it known that I, LOUIS LEICHT, a citizen of the United States, and a resident of the city of Yonkers, county of Westchester, and State of New York, have invented certain new and useful Attachments for Sleds, of which the following is a specification.

My invention relates to a roller and steering device adapted to be attached to children's sleds whereby the latter may be converted into a coaster for summer use. In my U. S. Patent No. 1,304,331 I showed a roller attachment adapted to be applied to sleds to convert them for use in summer and the object of the present device is to make the forward rollers pivotal and to provide means for turning them so that the sled may be steered in any direction. To this end my invention resides in a novel steering device which is simple in construction, reliable, and which may be readily applied to a sled by any person without special mechanical knowledge or tools. It is my intention to provide a device which may be sold as a separate attachment and which may be readily applied to the standard forms of sleds by the users. The present device is durable, and efficient for the purpose intended.

In the drawing forming part of this application,

Figure 1 is an elevation of the forward end of a sled having my invention applied thereto, Fig. 2 is a plan view thereof, Fig. 3 is a side elevation of the sled, Fig. 4 is a detail sectional view showing one of the connections, and Fig. 5 is a sectional view taken on the line 4—4 of Fig. 1.

I have shown a child's sled 1 including the top 2 the runners 3 and the standards 4 connecting the top 2 and the runners. I have shown my invention applied to the form of sled which is adapted to be steered by means of a steering bar 5 which swings the top board 2 and flexes the runners, though the invention is not limited in application to this form of sled.

There is a roller device 6 attached to each runner at the rear end of the sled and these roller devices are preferably made like the device shown in my said patent. The roller devices attached to each runner near the forward end of the sled are constructed to permit the rollers to be turned for steering the sled. The clamping portions of these roller devices are preferably like those shown in my said patent. I provide a clamping member 7 which fits over the vertical web 8 of the runner and it extends outwardly in horizontal webs 9, which are provided with bolt apertures. The plate 10 rests against the under side of the runner and it has apertures corresponding to the apertures in the webs 9. The bolts 11 passing through these apertures draw the upper and lower clamping members 7, 10 toward each other and hold them securely in place on the runner.

There is an inverted U shaped plate having its intermediate portion 12 pivoted to the clamping plate 10 by a pin 13 so that the fork member may pivot on a vertical axis. The downwardly extending members 14 form a fork in which the wheel or roller 15 is mounted upon an axle 16. The roller device on each runner is the same, so that the description applies to both.

There is an arm 16 secured at one end 17 by the pin 13 and lying between the vertical members or forks 14, so that the arm 16 and the fork turn in unison on the pin 13 as if they were one and the same. In fact, the arm 16 may be made integral with the fork member if desired. The forward ends of the arms 16 are pivoted to a cross bar 17ᵃ which causes the arms 16 and the rollers 15 at each side of the sled to turn in parallelism.

There is a rod 18 secured to the cross bar 17ᵃ at 19 by means of a rivet and this connection is a non-pivotal one, so that the cross bar 17ᵃ and the rod 18 move as one body. I have turned the end 20 of the rod 18 over the bar 17ᵃ and made the connection such that the rod can not pivot in relation to the bar.

There is a steering lever 21 arranged at the top of the sled and at the front end thereof and this is pivoted on a bolt 22 at its center, to the sled frame. This bolt may be the same bolt that secures the runner steering bar 5 to the frame, but the steering lever 21 is intended to be independent in its operation to the ordinary or runner steering device 5. There are raised handle portions 23 on the ends of the lever 21 by which the latter may be grasped and turned upon its pivot. There is an arched member or bow 24 fixed at each end to the steering lever 21 and at the middle thereof this bow extends some distance forwardly of the pivot 22. The rod 18, which is curved upwardly to the level of the bow 24 is pivoted to the latter at 25, and the pivotal pin is adapted to slide in the slot 26 in the rod 18.

The sled is adapted to travel on all four rollers only the forward pair being pivotal. The rider grasps the steering lever 21 and turns it toward the right or left whenever the sled is to be turned to the right or left. As the lever 21 turns on its pivot 22 the pivotal point or connection 25 swings on an arc having its center in the pivot 22. This moves the rod 18 to the right or left, causing the bar 17$^a$, arms 16 and the rollers 15 to turn to the right or left and the sled turns accordingly. If the distance between the pivots 22 and 25 and the pivots 13 and 27 is different the bolt 25 will slide in the slot 26 so that the steering lever 21 and the rod 18 will not bind.

The present device may be sold as a separate device so that it may be applied to sleds previously obtained.

Having described my invention what I claim is:

1. A device of the class described comprising a body and a pivotal wheel or roller thereon and means for operating the latter to steer the body comprising a rod adapted to turn said wheel or roller, a steering lever pivoted to said body and a pivotal and sliding connection between said steering lever and said rod for the purpose set forth.

2. A device of the class described comprising clamps adapted to be attached to a sled runner, pivoted wheels or rollers attached to said clamps and having steering arms for turning said wheels or rollers on their pivots, a bar connecting said arms to cause them to move in parallelism, a forwardly extending rod having a fixed connection with said bar, a lever pivoted to said body and having a pivotal connection with said rod, spaced apart from the point where said lever is pivoted to said body, whereby when said lever is rocked said bar will be moved bodily sidewise to turn said wheels or rollers.

3. A device of the class described comprising clamps adapted to be attached to a sled runner, pivoted wheels or rollers attached to said clamps and having steering arms for turning said wheels or rollers on the pivots, a bar pivotally connected with said arms to cause them to move in parallelism, a forwardly extending rod having a fixed connection with said bar, a lever extending crosswise of said body and pivoted to said body at its middle portion, an arch or bow on said lever extending forwardly of said lever and a sliding, pivotal connection between the forward end of said rod and said bow for the purpose set forth.

Signed at the city, county and State of New York, this 19th day of July, 1919.

LOUIS LEICHT.